(12) United States Patent
Williams et al.

(10) Patent No.: US 8,408,344 B2
(45) Date of Patent: Apr. 2, 2013

(54) SEALING MEMBERS FOR RADIATOR ASSEMBLIES AND RADIATOR ASSEMBLIES COMPRISING THE SAME

(75) Inventors: Alan Keith Williams, West Bloomfield, MI (US); Edgar Vargas, Universal City, TX (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 195 days.

(21) Appl. No.: 12/873,646

(22) Filed: Sep. 1, 2010

(65) Prior Publication Data
US 2012/0048633 A1 Mar. 1, 2012

(51) Int. Cl.
*B60K 11/04* (2006.01)
(52) U.S. Cl. ............................ 180/68.4; 180/68.6
(58) Field of Classification Search ............... 180/68.4, 180/68.2, 68.6, 68.1
See application file for complete search history.

(56) References Cited

U.S. PATENT DOCUMENTS

| | | | |
|---|---|---|---|
| 4,443,508 A | 4/1984 | Mehl | |
| 4,472,469 A | 9/1984 | Thies | |
| 4,533,012 A | 8/1985 | Komoda | |
| 5,048,249 A | 9/1991 | Shreiner et al. | |
| 5,668,351 A | 9/1997 | Hanlon et al. | |
| 6,105,660 A * | 8/2000 | Knurr | 180/68.4 |
| 6,318,450 B1 * | 11/2001 | Acre | 165/67 |
| 6,543,525 B2 * | 4/2003 | Kalbacher | 180/68.1 |
| 6,740,390 B2 | 5/2004 | Randazzo | |
| 6,830,228 B2 | 12/2004 | Ernst | |
| 6,883,589 B2 * | 4/2005 | Ozawa et al. | 180/68.1 |
| 7,013,951 B2 * | 3/2006 | Bauer et al. | 180/68.4 |
| 7,165,515 B2 | 1/2007 | Jacquay | |
| 7,464,783 B2 | 12/2008 | Gray et al. | |
| 7,467,679 B2 * | 12/2008 | Honzek et al. | 180/68.4 |
| 7,726,428 B2 * | 6/2010 | Kowalski | 180/68.6 |
| 2003/0205918 A1 | 11/2003 | Carvalho et al. | |
| 2007/0113482 A1 | 5/2007 | Dumke et al. | |
| 2007/0277752 A1 | 12/2007 | Smith et al. | |

FOREIGN PATENT DOCUMENTS

| | | |
|---|---|---|
| JP | 11036866 | 2/1999 |
| JP | 2004314664 | 11/2004 |
| JP | 2009012599 | 1/2009 |
| KR | 98074618 | 3/1997 |

* cited by examiner

*Primary Examiner* — Hau Phan
(74) *Attorney, Agent, or Firm* — Dinsmore & Shohl LLP

(57) ABSTRACT

Sealing members for vehicle radiator assemblies and vehicle radiator assemblies comprising sealing members are disclosed. In one embodiment, a sealing member for a radiator assembly includes a central panel, a mounting connector, and a flexible skirt element. The mounting connector may be formed in an upper edge of the central panel and extend across a width of the central panel. The mounting connector and the central panel are formed from a first polymeric material. The flexible skirt element may be formed in a lower edge of the central panel and extend across the width of the central panel. The flexible skirt element may be formed from a second polymeric material that is elastically deformable and recoverable. The first polymeric material may be relatively harder than the second polymeric material. The sealing member may be coupled to a radiator assembly installed in an engine compartment of a vehicle.

16 Claims, 4 Drawing Sheets

SEALING MEMBERS FOR RADIATOR ASSEMBLIES AND RADIATOR ASSEMBLIES COMPRISING THE SAME

TECHNICAL FIELD

The present specification generally relates to radiator assemblies for vehicles and, more specifically, to sealing members for radiator assemblies and radiator assemblies comprising the same.

BACKGROUND

In motor vehicles, there is a need to direct airflow over a radiator to maintain the proper engine operating temperature and over a condenser to cool refrigerant for an air-conditioning system. However, when the vehicle is moving, the regions behind the radiator and the condenser typically comprise low pressure regions. Because of the layout of components in an engine compartment, there is typically a gap between the bottom of the radiator and the top of a radiator mount. High-pressure air in front of the radiator and the condenser tends to leak through this gap, causing aerodynamic drag on the vehicle. This high pressure air would preferably be directed under the vehicle to minimize drag on the vehicle.

Previous attempts to seal the gap between the bottom of the radiator and the top of the radiator mount included using open cell foam attached to one of the radiator or the radiator mount with an adhesive. However, the open cell foam is time-consuming to install, retains water, and is easily abraded.

Accordingly, a need exists for alternative sealing members for a radiator assembly for a motor vehicle.

SUMMARY

In one embodiment, a sealing member for a radiator assembly includes a central panel, a mounting connector, and a flexible skirt element. The mounting connector may be formed in an upper edge of the central panel and extends across a width of the central panel. The mounting connector and the central panel are formed from a first polymeric material. The flexible skirt element may be formed in a lower edge of the central panel and extend across the width of the central panel. The flexible skirt element may be formed from a second polymeric material that is elastically deformable and recoverable. The first polymeric material may be relatively harder than the second polymeric material.

In another embodiment, a radiator assembly may include a radiator, a lower flange member coupled with the radiator and a sealing member coupled to the lower flange member. The sealing member may include a flexible skirt element which is deformable and recoverable. The flexible skirt element extends below a bottom of the radiator thereby shielding a lower portion of the radiator. In one embodiment, the sealing member may also include a central panel and a mounting connector. In this embodiment the mounting connector may be formed in an upper edge of the central panel and extend across a width of the central panel. The mounting connector couples the sealing member to the lower flange member of the radiator assembly. In this embodiment, the flexible skirt element may be formed in a lower edge of the central panel and extend across a width of the central panel.

In yet another embodiment, a vehicle may include a radiator-support member extending across a width of an engine compartment of the vehicle. A radiator assembly may be positioned on the radiator-support member. The radiator assembly may include a radiator and a lower flange member coupled with the radiator. A sealing member may be coupled with the lower flange member, the sealing member comprising a flexible skirt element. The flexible skirt element may be elastically deformable and recoverable. The sealing member may extend from the lower flange member and contact the radiator-support member such that the flexible skirt element of the sealing member conforms to a shape of the radiator-support member.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
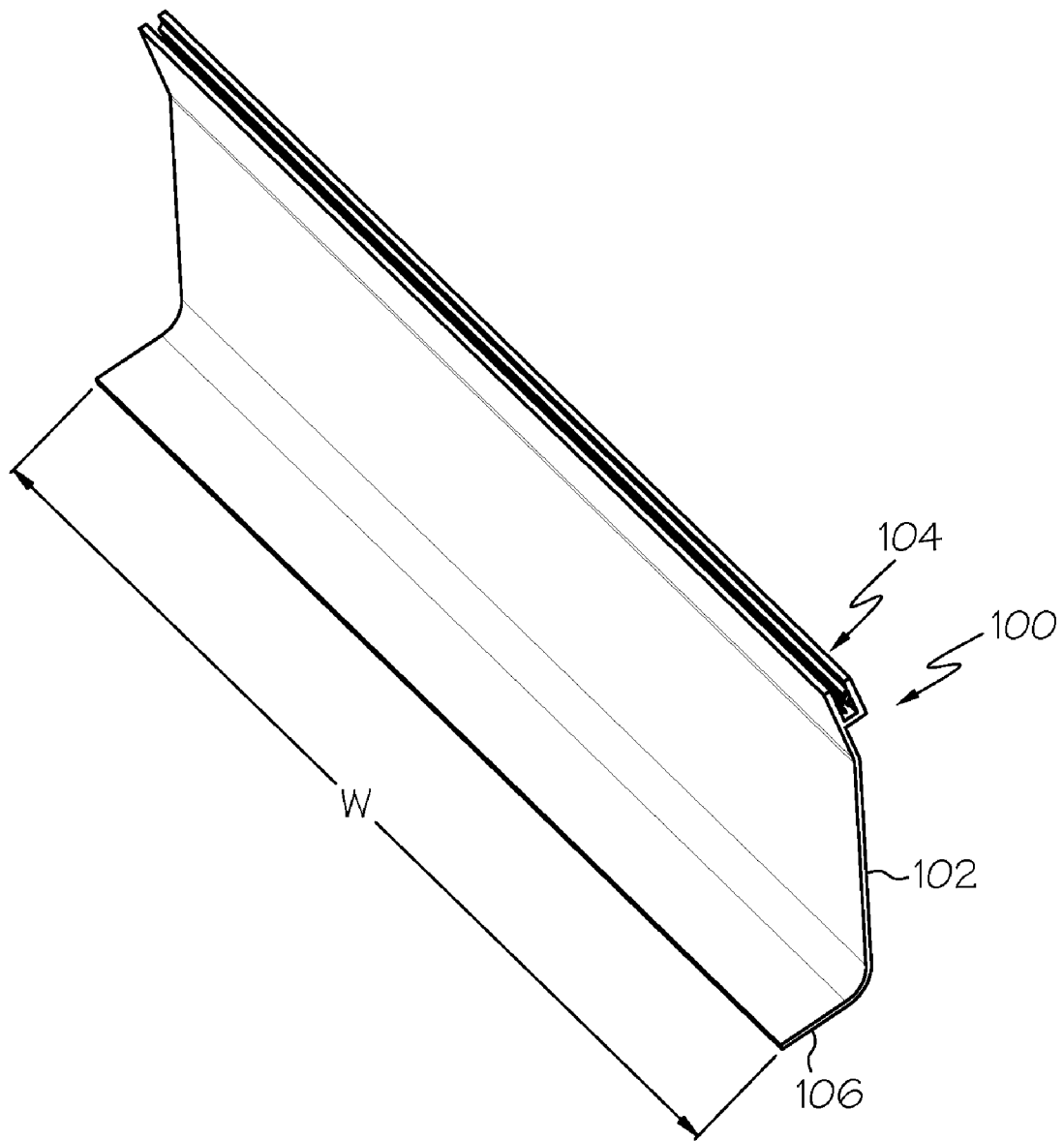
FIG. 1 depicts an isometric view of a sealing member for a radiator assembly of a vehicle according to one or more embodiments shown and described herein.

FIG. 1 generally depicts one embodiment of a sealing member for a radiator assembly of a vehicle. The sealing member generally includes a central panel, a mounting connecter formed along the upper edge of the central panel, and a flexible skirt element formed along a lower edge of the central panel. The mounting connector may include a plurality of forward sealing ribs and aft sealing ribs formed inside a channel of the mounting connector. The forward and aft sealing ribs may be deformable to facilitate securing the sealing member to a radiator assembly. The central panel and the mounting connector may be formed from a first polymeric material. The flexible skirt element may be formed from a second polymeric material. The first polymeric material may be harder than the second polymeric material, which permits sealing the flexible skirt element with a radiator-support member of a vehicle. Various embodiments of sealing members and radiator assemblies comprising sealing members will be described in more detail herein with reference to the appended figures.

Figure 2:
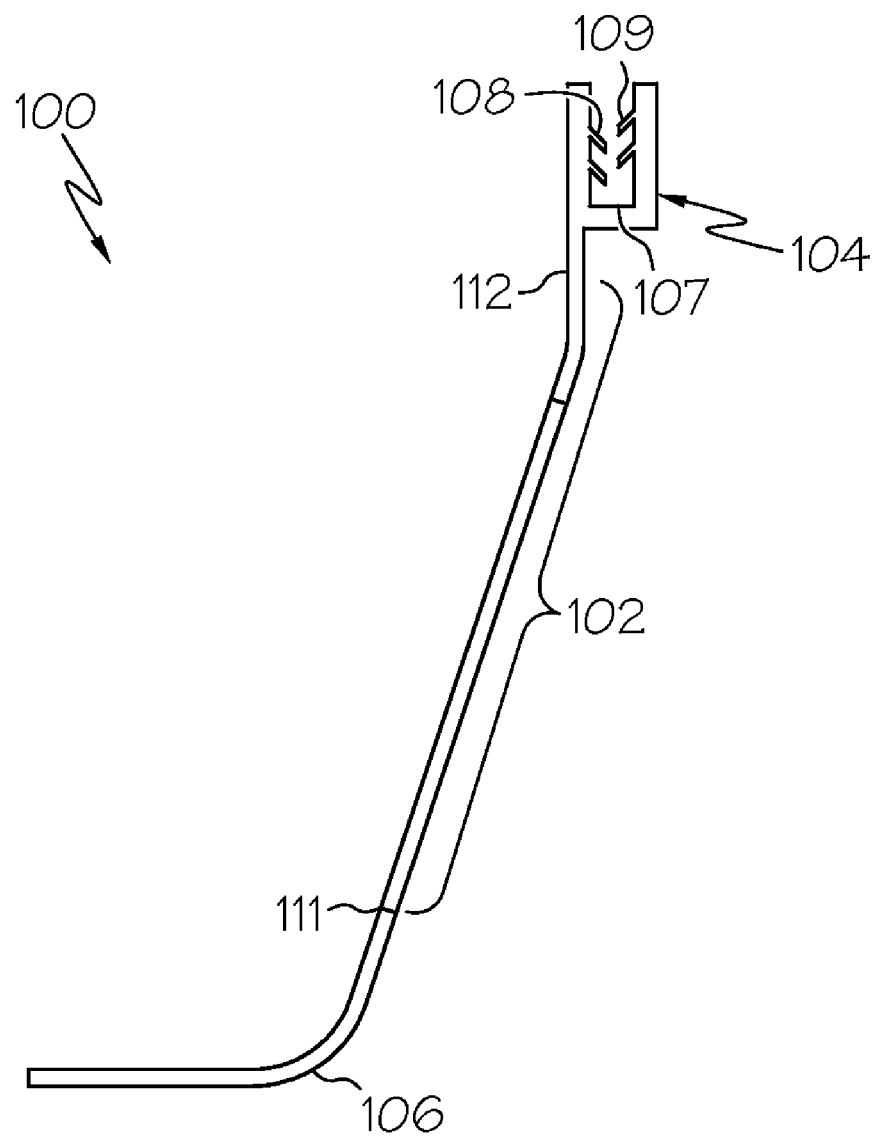
FIG. 2 depicts a cross sectional view of a sealing member according to one or more embodiments shown and described herein.

Referring now to FIGS. 1 and 2, one embodiment of a sealing member 100 for use with a radiator assembly of a vehicle is schematically depicted. The sealing member 100 generally comprises a central panel 102, a mounting connector 104, and a flexible skirt element 106. In the embodiments of the sealing member 100 described herein, the central panel 102, the mounting connector 104, and flexible skirt element 106 are formed from polymeric materials utilizing an extrusion process.

Still referring to FIGS. 1 and 2, the central panel 102 of the sealing member 100 extends between an upper edge 112 and a lower edge 111 and has a width W. In the embodiments of the sealing member 100 shown and described herein, the central panel 102 is generally planar. However, it should be understood that, in other embodiments (not shown) the central panel 102 may be non-planar, such as when the central panel has a radius of curvature between the upper edge 112 and the lower edge 111 to improve the aerodynamic or mechanical properties of the central panel 102.

The mounting connector 104 is formed on an upper edge 112 of the central panel 102. The mounting connector 104 is generally a rectangular channel which is U-shaped in cross section such that the mounting connector 104 may receive a corresponding connector of a radiator assembly. In the embodiment of the sealing member 100 shown in FIG. 1, the mounting connector 104 extends continuously across the entire width W of the sealing member 100.

In the embodiments of the sealing member 100 shown and described herein, the central panel 102 and the mounting connector 104 are formed from a first polymeric material which is relatively hard. For example, in one embodiment, the first polymeric material may have a shore D hardness from about 35 to about 36 following extrusion and curing, as measured according to ASTM D2240. Suitable materials from which the central panel 102 and the mounting connector 104 may be formed include, without limitation, a combination of ethylene propylene diene monomer (EPDM) with polypropylene (PP), which is sold under the trade name Santoprene™. In one embodiment, the EPDM/PP material may have a density of about 1.3 g/cm$^3$. However, it should be understood that EPDM/PP materials with other densities may be used to form the central panel 102 and the mounting connector 104. Further, it should also be understood that polymeric materials other than EPDM/PP may be used to form the central panel 102 and the mounting connector 104.

Still referring to FIGS. 1 and 2, in one embodiment, the mounting connector 104 is formed with a plurality of forward sealing ribs 108 and aft sealing ribs 109 formed in the channel of the mounting connector 104. In one embodiment, the forward sealing ribs 108 and the aft sealing ribs 109 may extend continuously along the entire width of the mounting connector 104 (i.e., across the entire width W of the sealing member 100). In the embodiment shown in FIGS. 1 and 2, the forward sealing ribs 108 and the aft sealing ribs 109 are oriented in the mounting connector 104 such that the sealing ribs are angled towards the bottom of the U-shaped channel. In this embodiment, the forward sealing ribs 108 and the aft sealing ribs 109 act as barbs that permit a corresponding connector to be inserted into the mounting connector by elastically deforming the forward sealing ribs 108 and the aft sealing ribs 109 towards the walls of the mounting connector 104, thereby providing an interference fit between the forward sealing ribs 108, the aft sealing ribs 109, and the corresponding connector, as is schematically illustrate in FIG. 4. This configuration of forward sealing ribs 108 and aft sealing ribs 109 prevents the corresponding connector from being readily withdrawn from the mounting connector 104. In this embodiment, the forward sealing ribs 108 and the aft sealing ribs 109 are integrally formed with the mounting connector 104 and the central panel 102.

In order provide the forward sealing ribs 108 and the aft sealing ribs 109 with the desired flexibility and elasticity, the forward sealing ribs 108 and the aft sealing ribs 109 may be formed from the same material as the central panel 102 and the mounting connector 104, albeit with a reduced thickness. Alternatively, the forward sealing ribs 108 and the aft sealing ribs 109 may be formed from a different polymeric material than the central panel 102 and the mounting connector 104, such as when the sealing member 100 is co-extruded from a plurality of polymeric materials. For example, in one embodiment, where the central panel 102 and the mounting connector 104 are formed from a combination of EPDM and PP, the forward sealing ribs 108 and the aft sealing ribs 109 may be formed from a second polymeric material having a lower hardness value, such as EPDM without PP, in order obtain the desired flexibility and elasticity.

While the embodiments of the mounting connector 104 shown in FIGS. 1 and 2 depict the mounting connector 104 as being formed with both a plurality of forward sealing ribs 108 and a plurality of aft sealing ribs 109, it should be understood that, in other embodiments (not shown), the mounting connector 104 may be formed with a single forward sealing rib and a single aft sealing rib. In still other embodiments (not shown), the mounting connector 104 may be formed with either forward sealing ribs 108 or aft sealing ribs 109. In other embodiments (not shown), the mounting connector 104 may be formed without either forward or aft sealing ribs, in which case a corresponding connector forms an interference fit with the interior sidewalls of the mounting connector 104 when the corresponding connector is inserted into the mounting connector 104.

Still referring to FIGS. 1 and 2, the flexible skirt element 106 is formed on a lower edge 111 of the central panel 102 and generally extends along the width of the central panel 102. The flexible skirt element 106 is elastically deformable and recoverable such that the flexible skirt element 106 conforms and seals to the shape of a structure on which it is positioned.

In the embodiments described herein, the flexible skirt element 106 is formed from a second polymeric material that is relatively softer than the first polymeric material from which the central panel 102 and the mounting connector 104 are formed. For example, in one embodiment, the second polymeric material may have a shore A hardness from about 53 to about 55 following extrusion and curing, as measured according to ASTM D2240. Suitable materials from which the flexible skirt element 106 may be formed include, without limitation, ethylene propylene diene monomer (EPDM). In one embodiment, the EPDM material may have a density of about 1.04 g/cm$^3$. However, it should be understood that EPDM materials with other densities may be used to form the flexible skirt element 106. Further, it should also be understood that polymeric materials besides EPDM may be used to form the flexible skirt element 106. Because the flexible skirt element 106 is formed from a different material than the central panel 102 and the mounting connector 104, it should be understood that the sealing member 100 is co-extruded from different materials (i.e., from the first polymeric material and the second polymeric material). Use of multiple materials of varying hardnesses allows for the sealing member 100 to be formed with both a rigid portion (i.e., the central panel 102 and the mounting connector 104) that can resist deformation, and a deformable and recoverable portion (i.e., the flexible skirt element 106) that can conform to an adjacent structure to form a seal.

In one embodiment, the central panel 102 and the flexible skirt element 106 may have similar wall thicknesses. In this embodiment, use of a harder polymeric material in the central panel 102 and a softer polymeric material in the flexible skirt element 106 allows the sealing member 100 to maintain rigidity in the central panel 102 while allowing flexibility in the flexible skirt element 106 while maintaining a substantially constant wall thickness throughout most of the sealing member 100.

Figure 3:
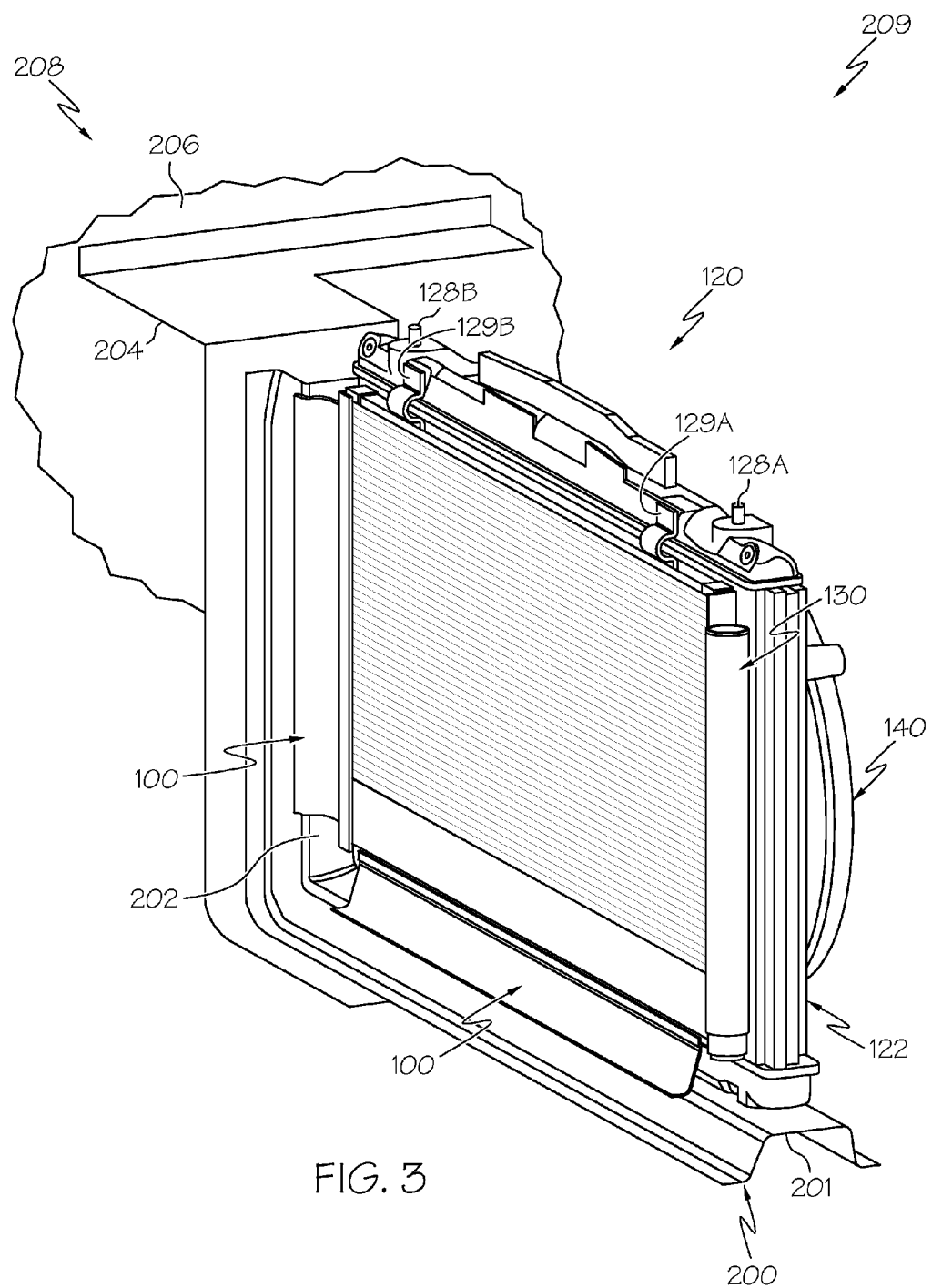
FIG. 3 schematically depicts a portion of a vehicle engine compartment of a vehicle in which a radiator assembly with a sealing member is installed, according to one or more embodiments shown and described herein.
Figure 4:
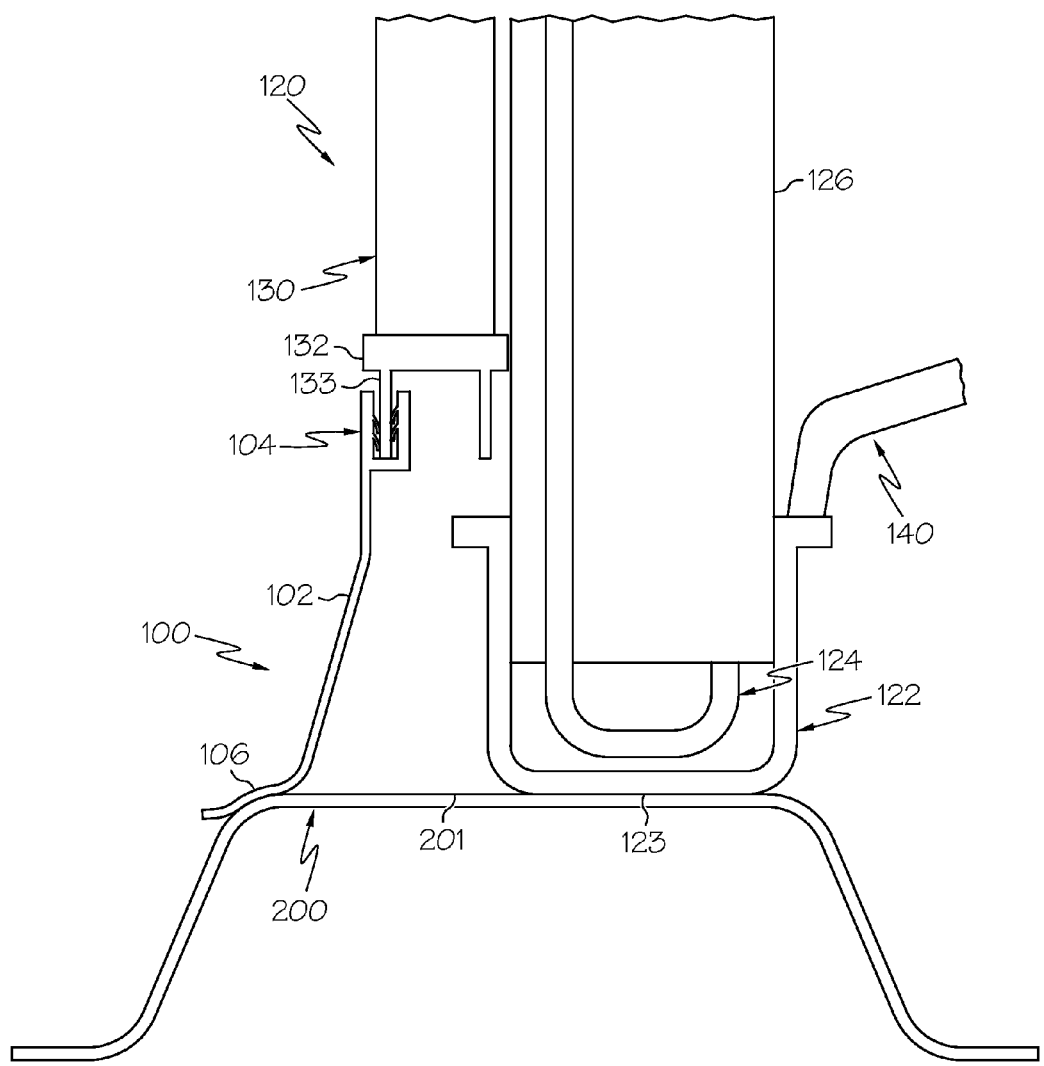
FIG. 4 schematically depicts a partial cross section of a radiator assembly positioned on a radiator support member of a vehicle according to one or more embodiments shown and described herein.

Referring now to FIGS. 3 and 4, in one embodiment, the sealing member 100 is used in conjunction with a radiator assembly 120 for a vehicle. For example, in the embodiment shown in FIGS. 3 and 4, the radiator assembly 120 includes a radiator 122, a condenser 130, and the sealing member 100. The condenser 130 may be mounted to a forward surface of the radiator 122 and attached with a plurality of mounting brackets 129A, 129B. A radiator cooling fan assembly 140 (partially illustrated in FIGS. 3 and 4) may be mounted to an aft surface of the radiator 122.

Referring to the embodiment of the radiator assembly 120 depicted in FIG. 4, the radiator assembly 120 further comprises a lower flange member 133 to which the sealing member 100 is attached. In the embodiment of the radiator assembly 120 depicted in FIG. 4, the lower flange member 133 is formed with the lower condenser cap 132 which is attached to a bottom of the condenser 130. The lower flange member 133 is configured to be removably received in the mounting connector 104 of the sealing member 100. The sealing member 100 may be coupled with the lower flange member 133 by sliding the sealing member 100 onto the lower flange member 133. When the lower flange member 133 is inserted into the mounting connector 104, the forward sealing ribs 108 and the aft sealing ribs 109 contact the lower flange member 133 thereby sealing the lower flange member 133 to the sealing member 100 and retaining the lower flange member 133 in the mounting connector 104.

While FIG. 4 schematically depicts the lower flange member 133 being coupled to the condenser 130, it should be understood that, in alternative embodiments, the lower flange member 133 may be coupled to the radiator 122. For example, in some embodiments (not shown), the radiator assembly 120 may be constructed without a condenser 130. In these embodiments, the lower flange member 133 may be coupled to a front face of the radiator 122. In embodiments either including a condenser 130 or excluding a condenser 130, the sealing member 100 may be arranged such that the flexible skirt element 106 extends beyond the bottom 123 of the radiator 122, thereby providing a protective barrier for the lower portion of the radiator 122 as depicted in FIGS. 3 and 4.

In the embodiments described herein, the radiator assembly 120 may be assembled from its constituent components prior to installation in a vehicle 209. Thereafter, the radiator assembly 120 may be installed in the engine compartment 208 of a vehicle 209 as a single unit. For example, in one embodiment, the radiator assembly 120 may be positioned in the engine compartment 208 of a vehicle 209 so that a bottom 123 of the radiator 122 is adjacent to a contoured support surface 201 of a radiator-support member 200. The upper region of the radiator assembly 120 may be attached to the vehicle 209 with radiator bracket attachment points 128A, 128B such that the radiator assembly 120 is secured in the engine compartment 208 of the vehicle. In one embodiment, bottom 123 of the radiator may be spaced apart from the contoured support surface 201 of the radiator-support member 200 thereby creating a gap between the bottom 123 of the radiator 122 and the contoured support surface 201 of the radiator-support member 200. With the radiator assembly 120 positioned over the radiator-support member 200, the flexible skirt element 106 of the sealing member 100 contacts the contoured support surface 201 of the radiator-support member 200 and conforms to the contoured support surface 201 thereby forming a seal between the radiator assembly 120 and the radiator-support member 200.

While the sealing member 100 has been described herein as being positioned between the radiator assembly 120 and the radiator-support member 200, it should be understood that sealing members 100 may also be positioned between the radiator assembly 120 and a substantially vertical portion of the radiator-support member 200. Referring to FIG. 3 by way of example, the radiator-support member 200 may have a body-side surface 202 that extends along a sidewall 206 of the engine compartment 208. In one embodiment, the sealing member 100 may be placed between the radiator assembly 120 and the body-side surface 202 of the radiator-support member 200 that extends along a sidewall of the engine compartment 208. In this embodiment, the mounting connector of the sealing member may be coupled to a corresponding connector located on the condenser 130. Alternately, the flange member may be coupled to the radiator 122 (not shown). With the sealing member positioned in this location, the sealing member 100 prevents hot air from circulating from a location aft of the radiator 122 to a location forward of the condenser 130 thereby improving the operating efficiency of both the condenser 130 and the radiator 122. In another embodiment, the sealing member 100 may be placed between the radiator assembly 120 and a sidewall 206 of the engine compartment 208 such that the flexible skirt element 106 of the sealing member 100 is in direct contact with the sidewall 206 of the vehicle. In yet another embodiment, the sealing member 100 may be positioned in a location such that the sealing member 100 prevents air from circulating from a location aft of the radiator 122 to a location forward of the radiator 122. In another embodiment, the sealing member 100 may be positioned in a location such that the sealing member 100 prevents air from circulating from a location aft of the condenser 130 to a location forward of the condenser 130.

The sealing members and vehicle radiator assemblies described herein may be utilized to improve the operating efficiency of vehicles in which they are installed. For example, by forming a seal between the radiator assembly 120 and the radiator-support member 200 or the sidewall 206 of the engine compartment 208 the sealing member 100 diverts airflow between the bottom 123 of the radiator 122 and the radiator-support member 200 to beneath the radiator-support member 200 thereby reducing drag and improving the aerodynamic efficiency of the vehicle 209. Further, the sealing member 100 prevents heated air aft of the radiator 122 from circulating to the forward side of the radiator 122 (i.e., the condenser side of the radiator assembly 120) which, in turn, improves the efficiency of both the radiator 122 and the condenser 130.

Moreover, the lower portions of the radiator fins 126 and the radiator tubes 124 are particularly susceptible to damage from foreign objects (i.e., gravel, sand, and/or other road debris) due to their positioning in the engine compartment 208 and close proximity to the surface of the roadway. Accordingly, in embodiments where the sealing member 100 extends between the radiator assembly 120 and the radiator-support member 200, the sealing member 100 (specifically the central panel 102 and flexible skirt element 106) may shield the radiator fins 126 and the radiator tubes 124 of the radiator 122 from road debris, such as gravel, sand, and the like, and thereby prevent damage to the radiator 122 and/or radiator assembly 120.

It should now be understood that the sealing members for radiator assemblies described herein comprise a central panel, a mounting connector formed in an upper edge of the central panel, and a flexible skirt element formed in a lower edge of the central panel. The sealing members may also include a plurality of forward sealing ribs and aft sealing ribs located within the mounting connector.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A sealing member for a radiator assembly of a vehicle, the sealing member comprising:
    a central panel;
    a mounting connector formed in an upper edge of the central panel and extending across a width of the central panel, wherein the mounting connector and the central panel are formed from a first polymeric material; and
    a flexible skirt element formed in a lower edge of the central panel and extending across the width of the central panel, wherein the flexible skirt element is formed from a second polymeric material that is elastically deformable and recoverable, the first polymeric material being relatively harder than the second polymeric material.

2. The sealing member as claimed in claim 1, wherein the mounting connector comprises a plurality of forward sealing ribs and aft sealing ribs that extend in a direction of the width of the central panel.

3. The sealing member as claimed in claim 2, wherein the forward sealing ribs and the aft sealing ribs are elastically deformable with respect to the mounting connector.

4. The sealing member as claimed in claim 2, wherein at least one of the forward sealing ribs or the aft sealing ribs are formed from the second polymeric material.

5. The sealing member as claimed in claim 1, wherein at least one of the first polymeric material and the second polymeric material comprises ethylene propylene diene monomer.

6. The sealing member as claimed in claim 1, wherein the first polymeric material comprises ethylene propylene diene monomer and the second polymeric material comprises ethylene propylene diene monomer and polypropylene.

7. A radiator assembly of a vehicle comprising:
    a radiator;
    a lower flange member coupled with the radiator; and
    a sealing member comprising a mounting connector, a central panel, and a flexible skirt element, the flexible skirt element being deformable and recoverable, wherein:
        the central panel has a width, an upper edge, and a lower edge, wherein the upper edge of the central panel is coupled with a mounting connector and extends across the width of the central panel;
        the mounting connector and the central panel of the sealing member are formed from a first polymeric material;
        the flexible skirt element of the sealing member is formed from a second polymeric material, the first polymeric material being relatively harder than the second polymeric material;
        the sealing member is coupled with the lower flange member; and
        the flexible skirt element of the sealing member is coupled with the lower edge of the central panel and extends across the width of the central panel and extends below a bottom of the radiator.

8. The radiator assembly as claimed in claim 7, further comprising a condenser coupled with a front of the radiator and the lower flange member is coupled with a bottom of the condenser.

9. The radiator assembly as claimed in claim 8, wherein the sealing member further comprises a plurality of forward sealing ribs and aft sealing ribs formed that extend in a direction of the width of the central panel.

10. The radiator assembly as claimed in claim 7, wherein at least one of the first polymeric material and the second polymeric material comprises ethylene propylene diene monomer.

11. A vehicle comprising:
    a radiator-support member extending across a width of an engine compartment of the vehicle; and
    a radiator assembly positioned on the radiator-support member, the radiator assembly comprising:
        a radiator;
        a lower flange member coupled with the radiator; and
        a sealing member coupled with the lower flange member, the sealing member comprising a mounting connector, a central panel, and a flexible skirt element, wherein:
            the central panel comprises a width, an upper edge, and a lower edge;
            the mounting connector coupled with the upper edge of the central panel extending across the width of the central panel;
            the mounting connector and the central panel are formed from a first polymeric material; and
            the flexible skirt element being elastically deformable and recoverable, wherein the sealing member extends from the lower flange member and rests on the radiator-support member, the flexible skirt element of the sealing member conforming to a shape of the radiator-support member, the flexible skirt element is formed from a second polymeric material, the first polymeric material being relatively harder than the second polymeric material.

12. The vehicle as claimed in claim 11, wherein the radiator assembly further comprises a condenser coupled with a front of the radiator, wherein the lower flange member is coupled with a bottom of the condenser.

13. The vehicle as claimed in claim 11, wherein the radiator-support member comprises a contoured surface.

14. The vehicle as claimed in claim 11, wherein the mounting connector further comprises a plurality of forward sealing ribs and aft sealing ribs extending in a direction of the width of the central panel.

15. The vehicle as claimed in claim 14, wherein at least one of the forward sealing ribs and the aft sealing ribs of the sealing member are formed from the second polymeric material.

16. The vehicle as claimed in claim 11, wherein at least one of the first polymeric material or the second polymeric material comprise ethylene propylene diene monomer.

* * * * *